(12) United States Patent
Zheng et al.

(10) Patent No.: US 12,530,597 B2
(45) Date of Patent: Jan. 20, 2026

(54) METHOD AND DEVICE FOR CONSTRUCTING LEGAL KNOWLEDGE GRAPH BASED ON JOINT ENTITY AND RELATION EXTRACTION

(71) Applicant: XI'AN JIAOTONG UNIVERSITY, Xi'an (CN)

(72) Inventors: Qinghua Zheng, Xi'an (CN); Kunming Ma, Xi'an (CN); Jun Liu, Xi'an (CN); Xingyi Li, Xi'an (CN); Dailusi Ma, Xi'an (CN); Jiaxin Wang, Xi'an (CN); Haiping Zhu, Xi'an (CN); Kexin Ma, Xi'an (CN); Hongxuan Li, Xi'an (CN); Bifan Wei, Xi'an (CN); Lingling Zhang, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 698 days.

(21) Appl. No.: 17/956,864

(22) Filed: Sep. 30, 2022

(65) Prior Publication Data

US 2023/0196127 A1 Jun. 22, 2023

Related U.S. Application Data

(63) Continuation of application No. PCT/CN2021/116053, filed on Sep. 1, 2021.

(30) Foreign Application Priority Data

May 11, 2021 (CN) .......................... 202110513432.2

(51) Int. Cl.
*G06N 5/02* (2023.01)
*G06F 16/36* (2019.01)
(Continued)

(52) U.S. Cl.
CPC ......... *G06N 5/02* (2013.01); *G06V 30/19127* (2022.01); *G06V 30/19187* (2022.01);
(Continued)

(58) Field of Classification Search
CPC ............ G06N 5/02; G06N 3/042; G06N 3/08; G06N 3/044; G06N 3/045; G06N 5/022;
(Continued)

(56) References Cited

U.S. PATENT DOCUMENTS

2010/0145902 A1* 6/2010 Boyan ................... G06F 16/958
715/810
2020/0073933 A1 3/2020 Zhao et al.

FOREIGN PATENT DOCUMENTS

CN 108874878 A 11/2018
CN 109977237 A 7/2019
(Continued)

OTHER PUBLICATIONS

Dong et al (NPL "A Knowledge Graph Construction Approach for Legal Domain" Published Feb. 28, 2021 by Technical Gazette pp. 357-362 (Year: 2021).*
(Continued)

*Primary Examiner* — Quoc A Tran
(74) *Attorney, Agent, or Firm* — Wiersch Law Group

(57) ABSTRACT

A method and device for constructing a legal knowledge graph based on joint entity and relation extraction. The construction method comprises the following steps: constructing a triple data set; design of a model architecture and training of a model, wherein the model architecture comprises an encoding layer, a head entity extraction layer and a relation-tail entity extraction layer; determination of the relation between the sentences of the text; triple combination and graph visualization. The design of the model framework of the present disclosure adopts a Chinese Bert pre-training
(Continued)

model as an encoder. In the entity extraction part, two BiLSTM binary classifiers are used to identify the start position and end position of an entity. The head entity is first extracted, and then the tail entity corresponding to the entity relation is extracted from the extracted head entity.

7 Claims, 5 Drawing Sheets

(51) Int. Cl.
    *G06F 18/20*     (2023.01)
    *G06F 18/241*     (2023.01)
    *G06F 40/211*     (2020.01)
    *G06F 40/295*     (2020.01)
    *G06F 40/30*     (2020.01)
    *G06N 3/042*     (2023.01)
    *G06N 3/044*     (2023.01)
    *G06N 3/045*     (2023.01)
    *G06N 3/08*     (2023.01)
    *G06N 5/022*     (2023.01)
    *G06V 30/19*     (2022.01)

(52) U.S. Cl.
    CPC .......... *G06F 16/367* (2019.01); *G06F 18/241* (2023.01); *G06F 18/29* (2023.01); *G06F 40/211* (2020.01); *G06F 40/295* (2020.01); *G06F 40/30* (2020.01); *G06N 3/042* (2023.01); *G06N 3/044* (2023.01); *G06N 3/045* (2023.01); *G06N 3/08* (2013.01); *G06N 5/022* (2013.01)

(58) Field of Classification Search
    CPC ........ G06V 30/19127; G06V 30/19187; G06F 18/241; G06F 18/29; G06F 16/367; G06F 40/211; G06F 40/295; G06F 40/30
    See application file for complete search history.

(56) References Cited

FOREIGN PATENT DOCUMENTS

| CN | 110781254 A | 2/2020 |
|----|-------------|--------|
| CN | 111858940 A | 10/2020 |
| CN | 113204649 A | 8/2021 |

OTHER PUBLICATIONS

International Search Report (PCT/CN2021/116053); Date of Mailing: Feb. 11, 2022.
A-Novel-Cascade-Binary-Tagging-Framework-for-Relational-Triple-Extraction.

* cited by examiner

| sentence | head1 | tail1 | relation1 |
|---|---|---|---|
| 承租人应当妥善保管租赁物 | 承租人 | 妥善保管租赁物 | 应当 |
| 承租人应当承担损害赔偿责任。 | 承租人 | 承担损害赔偿责任 | 应当 |
| 承租人在租赁物需要维修时可以要求出租人在合理期限内维修 | 承租人 | 要求出租人在合理期限内维修 | 可以 |
| 承租人可以自行维修 | 承租人 | 自行维修 | 可以 |
| 因承租人保管不善造成租赁物毁损、灭失的 | 承租人 | 租赁物毁损、灭失的 | 致使 |
| 维修费用由出租人负担。 | 出租人 | 维修费用 | 负担 |
| 承运人应当向旅客及时告知有关不能正常运输的重要事由和安全 | 承运人 | 向旅客及时告知有关不能正常运输的重要事由和安全 | 应当 |
| 旅客、托运人或者收货人应当支付票款或者运输费用。 | 旅客、托运人或者收货人 | 支付票款或者运输费用 | 应当 |
| 承运人未按照约定路线或者通常路线运输增加票款或者运输费用的 | 承运人 | 按照约定路线或者通常路线运输增加票款或者运输费用 | 未 |
| 旅客、托运人或者收货人可以拒绝支付增加部分的票款或者运输费用 | 旅客、托运人或者收货人 | 拒绝支付增加部分的票款或者运输费用 | 可以 |

FIG. 2

METHOD AND DEVICE FOR CONSTRUCTING LEGAL KNOWLEDGE GRAPH BASED ON JOINT ENTITY AND RELATION EXTRACTION

CROSS-REFERENCE TO RELATED APPLICATIONS

The present application is a continuation of International Application No. PCT/CN2021/116053, filed on Sep. 1, 2021, which claims priority to Chinese Application No. 202110513432.2, filed on May 11, 2021, the contents of both of which are incorporated herein by reference in their entireties.

TECHNICAL FIELD

The present disclosure belongs to the field of electronic information, and are particularly related to a method and device for constructing a legal knowledge graph based on joint entity and relation extraction.

BACKGROUND

A knowledge graph, which is called knowledge domain visualization or knowledge domain choropleth map in the library and information industry, includes a series of different graphs showing the knowledge development process and structural relation. Knowledge resources and their carriers are described using visualization technology, and knowledge and their interrelations are mined, analyzed, constructed, drawn and displayed. A knowledge graph is a modern theory that combines the theories and methods of applied mathematics, graphics, information visualization technology, information science and other disciplines with bibliometric citation analysis, co-occurrence analysis and other methods, and visually displays the core structure, development history, frontier fields and overall knowledge structure of a discipline by means of visualized graphs so as to realize multi-disciplinary integration, which can provide practical and valuable reference for discipline research.

Knowledge graphs are divided into general knowledge graphs and domain knowledge graphs. The two knowledge graphs are mainly different in coverage and usage. A general knowledge graph is oriented to the general field, which mainly contains a lot of common knowledge in the real world and covers a wide range. A domain knowledge graph, also known as industry knowledge graph or vertical knowledge graph, is oriented to a specific field, and it is an industry knowledge base composed of professional data in this field. Because it is based on industry data and has strict and rich data patterns, it has higher requirements for the depth and accuracy of knowledge in this field. A domain knowledge graph is a knowledge graph for a specific field, such as e-commerce, finance, medical care, etc. Comparatively speaking, the domain knowledge graph has more knowledge sources, faster scale expansion, a more complex knowledge structure, higher requirements for knowledge quality and more extensive application forms.

Nowadays, the construction and research of knowledge graphs oriented to the legal field are still scarce. With the rapid and comprehensive development of law, the demand for knowledge graphs in the legal field is gradually emerging. The construction of a domain knowledge graph needs a lot of information in this field. How to extract valuable information from massive unstructured or semi-structured information has attracted the attention of many scholars, and information extraction technology has emerged as the times require. The construction of a knowledge graph mainly uses the subtasks of entity extraction and relation extraction in information extraction. The entity extraction technology, also known as named entity recognition technology, refers to the identification of entities with specific meanings in extracted texts, mainly including names of people, places, institutions, proper nouns, and words such as time, quantity, currency, and proportional value. The main task of relation extraction is to extract the relations between entities in the text. Generally, the relation between entities is formally described as a triple relation <h, r, t>, where h and t represent a head entity and a tail entity, and r represents the relation between entities. For example, in the sentence "Farewell My Concubine is directed by Chen Kaige", "Farewell My Concubine" and "Chen Kaige" are both entities, and the relation between the two entities is the "directed" relation, which can be expressed as "Farewell My Concubine, directed by Chen Kaige" by triples. The main purpose of information extraction is to extract data in the form of triples from a large number of unstructured or semi-structured texts. However, the traditional information extraction technology adopts a pipeline method. For unstructured texts, entity extraction is carried out first, and then relation extraction is carried out on the basis of the entity extraction result. This has a big drawback, that is, once the result of entity extraction is wrong, it will greatly affect the accuracy of relation extraction, which will lead to error propagation.

SUMMARY

In view of the problem that the accuracy of knowledge graph construction in the legal field cannot be guaranteed in the prior art, the present disclosure provides a method and device for constructing a legal knowledge graph based on joint entity and relation extraction, so as to obtain a knowledge graph with higher accuracy.

In order to achieve the above purpose, the present disclosure has the following technical solution:

A method for constructing a legal knowledge graph based on joint entity and relation extraction, including the following steps:

—Constructing a Triple Data Set.

Splitting a sentence of a legal text into short sentences.

Completing default subjects in the short sentences.

Extracting triples from the short sentences and constructing the triple data set.

—Designing a Model Architecture and Training a Model.

The model architecture comprises an encoding layer, a head entity extraction layer and a relation-tail entity extraction layer.

In an embodiment, the encoding layer uses a Bert pre-training model.

In the head entity extraction layer, two BiLSTMs are used as binary classifier, and codes of a text are used as an input of the classifiers; in output information, an entity start position corresponding to the first BiLSTM binary classifier is output as 1, with outputs of the other positions being all 0, and an entity end position corresponding to the second BiLSTM binary classifier is output as 1, with outputs of the other positions being all 0.

The relation-tail entity extraction layer combines coding information of head entities with the codes of the sentence as an input, and for each head entity, finds tail entities that may exist under each relation, and finally obtains a complete triple.

—Determining the Relation Between the Sentences of the Text.

For a sentence of the legal text that has not been split into short sentences, determining the relation between the short sentences.

—Triple Combination and Graph Visualization.

Obtaining a combined triple corresponding to the legal text according to the triple extracted by the model and the relation between sentences of the text.

Visualizing the legal knowledge graph.

The present disclosure further provides a legal knowledge graph construction system based on joint entity and relation extraction, including:

A triple data set construction module configured to split a sentence of a legal text into short sentences, complete default subjects in the short sentences, and finally extract triples from the short sentences to constructing a triple data set.

A model building and training module configured to respectively construct an encoding layer, a head entity extraction layer and a relation-tail entity extraction layer in a model architecture and obtain a model capable of extracting triples by training.

An inter-sentence relation determining module configured to determine the relation between short sentences for a sentence of the legal text which has not be split into short sentences.

A knowledge graph visualization module configured to obtain a combined triple corresponding to the legal text according to the triples extracted by the model and the relation between sentences of the text, and realize visualization of the legal knowledge graph.

The present disclosure further provides a terminal device, comprising a memory, a processor and a computer program stored in the memory and running on the processor, wherein when the processor executes the computer program, the steps of the method for constructing a legal knowledge graph based on joint entity and relation extraction are implemented.

The present disclosure further provides a computer-readable storage medium, which stores a computer program, wherein the computer program, when executed by a processor, implements the steps of the method for constructing a legal knowledge graph based on joint entity and relation extraction.

Compared with the prior art, the present disclosure has the following beneficial effects:

The existing knowledge graph construction methods often adopt the idea of pipeline, which first extracts entities and then extracts relations with the results of entity extraction, which will lead to the accumulation of errors. The present disclosure utilizes a model based on joint entity and relation extraction to perform triple extraction for unstructured texts in the field of contract law, and finally constructs a knowledge graph in the field of law. The present disclosure can avoid error propagation caused by the pipeline method, and has high accuracy. The design of the model framework of the present disclosure adopts the Chinese Bert pre-training model as an encoder, which has a good effect on Chinese text encoding. As the entities in the field of law are in the form of phrases, the entity extraction part adopts two BiLSTM binary classifiers to identify the start position and end position of the entities, which can effectively extract the entities in the form of phrases from the text. According to the present disclosure, given a paragraph of a text, the head entity is extracted first, and then the tail entity corresponding to the entity relation is extracted by the extracted head entity. When extracting entity relations and tail entities, not only the encoding information of sentences is used, but also the encoding information of head entities is incorporated. A legal knowledge graph with high accuracy can be obtained by the method, and the constructed knowledge graph can realize the functions of question-and-answer reasoning and related recommendation in the field of contract law by combining with deep learning technology.

BRIEF DESCRIPTION OF DRAWINGS

FIG. 2 is a sample data set constructed by model training according to an embodiment of the present disclosure;

DESCRIPTION OF EMBODIMENTS

The present disclosure will be further explained in detail with reference to the drawings and embodiments below.

The present disclosure provides a method for constructing a legal knowledge graph based on joint entity and relation extraction. The embodiment is explained by taking the contract law as an example. The present disclosure can use a given contract law text to extract entities and relations at the same time, and finally obtains complete triple information. The extracted triples are connected end to end to form a knowledge graph of contract law. The completed knowledge graph can be combined with deep learning technology to realize the functions of question-and-answer reasoning and related recommendation in the field of contract law.

Entity extraction: for any complete contract law text statement, it can be decomposed into the form of (h, r, t), where h represents the head entity, r represents the entity relation, and t represents the tail entity. Entity extraction means extracting the head and tail entities in the text.

Relation extraction: the relation here refers to the relation between entities or the attributes of entities. This step usually involves extraction of the corresponding entity relation after the extraction of the head entity and the tail entity is completed.

Joint extraction: different from the previous entity extraction and relation extraction, which are carried out independently, the entities and relations extracted by joint extraction influence each other. Using joint extraction can reduce the error propagation problem caused by entity extraction.

Figure 1:
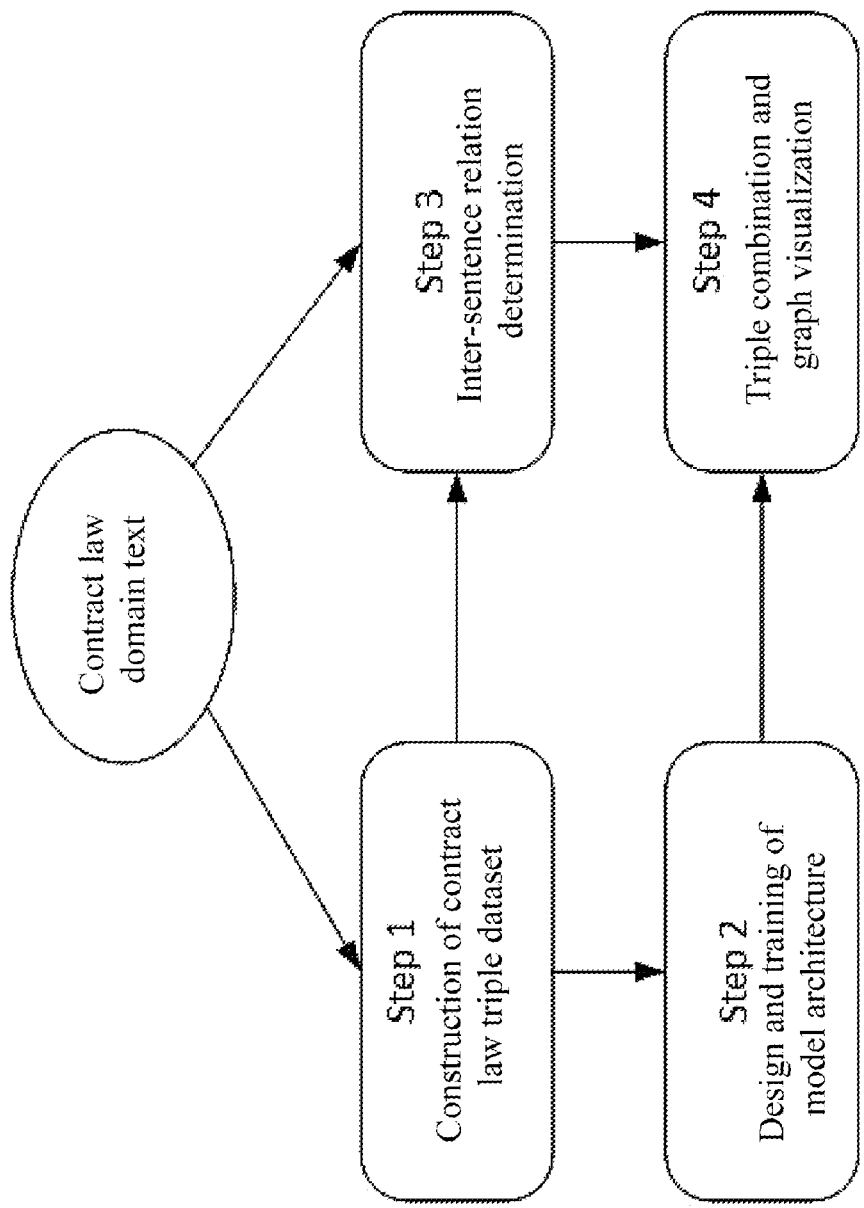
FIG. 1 is a flowchart of the method for constructing a contract law knowledge graph according to an embodiment of the present disclosure.

Referring to FIG. 1, the method for constructing a contract law graph based on joint entity and relation extraction in the embodiment of the present disclosure includes the following steps:

1. Constructing a Triple Data Set of Contract Law, Including:

1.1) Splitting a Complex Contract Law Text Statement into Simple Short Sentences.

According to the characteristics of contract law texts, most contract law texts are composed of two or more short sentences, and there is a certain logical relation between the short sentences, for example, in Article 9 of the Contract Law, "the parties shall have corresponding capacity for civil rights and civil capacity when concluding a contract". In order to extract the triples from the text accurately, it is necessary to split the statement into several short sentences. Two short sentences can be obtained from this example: "the parties conclude a contract" and "shall have corresponding capacity for civil rights and capacity for civil conduct".

1.2) Using the Technology of Zero Anaphora Resolution to Solve the Problem of Subject Loss Caused by Short Sentence Splitting.

Subjects may be missing in some short sentences in the split text short sentences obtained in step 1, which will affect the subsequent triple extraction, so it is necessary to complete the default subjects. In this method, the open source tool pyltp is combined with a dependency syntactic analysis method to perform syntactic analysis on the default part and complete the default subjects. The result of the examples in step 1, after subject completion, is the short sentences "the parties conclude a contract" and "(the parties) should have corresponding capacity for civil rights and capacity for civil conduct".

1.3) Constructing a Triple Data Set of Contract Law.

For the short sentences after subject completion, the required triples can be extracted therefrom. In order to ensure the performance of the triple extraction model, it is necessary to manually label triple data to train the model. A complete sentence usually consists of three parts: the subject, the predicate and the object. Therefore, when marking data, the subject and the object of the sentence are taken as the head entity and the tail entity respectively, and the predicate is preliminarily marked as the relation. After labeling some triples, the relation set is determined according to the labeled relations, and the relations with the same or similar semantics are merged. For example, the relation "concept" and the relation "definition" are semantically similar, and the relation "definition" is unified into the relation "concept". FIG. 2 is an example of partially labeled triples. Finally, 798 manually calibrated triples are obtained, and the entity relation set contains 25 relations.

Step 2: Designing the Model Architecture and Training the Model, Including:

2.1) Designing a Model Architecture.

After the labeling of triple training data, the following experimental model is designed. The design of this model mainly considers the following aspects. Firstly, the Bert pre-training model uses a bidirectional Transformer, and at the same time, it uses the Masked Language Model (MLM) to capture the word-level representation in the pre-training process, which makes the word vector change from only the previous information to information capable of learning the context, and uses the Next Sentence Prediction (NSP) to capture the sentence-level representation in the pre-training process. Therefore, using a Bert pre-training model in an encoding layer can better represent the deep meaning of sentences. Secondly, the entity in the text of contract law is different from the entity in the general field in that it contains not only word entities, but also phrase entities, so the traditional NER method cannot accurately extract phrase entities. Therefore, two BiLSTMs are considered as binary classifiers, and the text encoding is used as the input of the classifier; in the output information, the start position of the entity corresponding to the first BiLSTM classifier is 1, and the outputs of the other positions are all 0, while the end position of the entity corresponding to the second BiLSTM classifier is 1, and the outputs of the other positions are all 0; the position encoding of the start position and the end position of the entity is extracted respectively, so that phrase entities can be well extracted as needed. Thirdly, in order to make full use of the encoding information of the head entity in the extraction of the entity relation and the tail entity, the input of the extraction part of the entity relation and the tail entity of the model is not only the encoding information of the whole sentence, but the encoding information of the head entity is combined with the coding of the sentence, which has a good effect on the extraction of the entity relation and tail entity.

Figure 3:
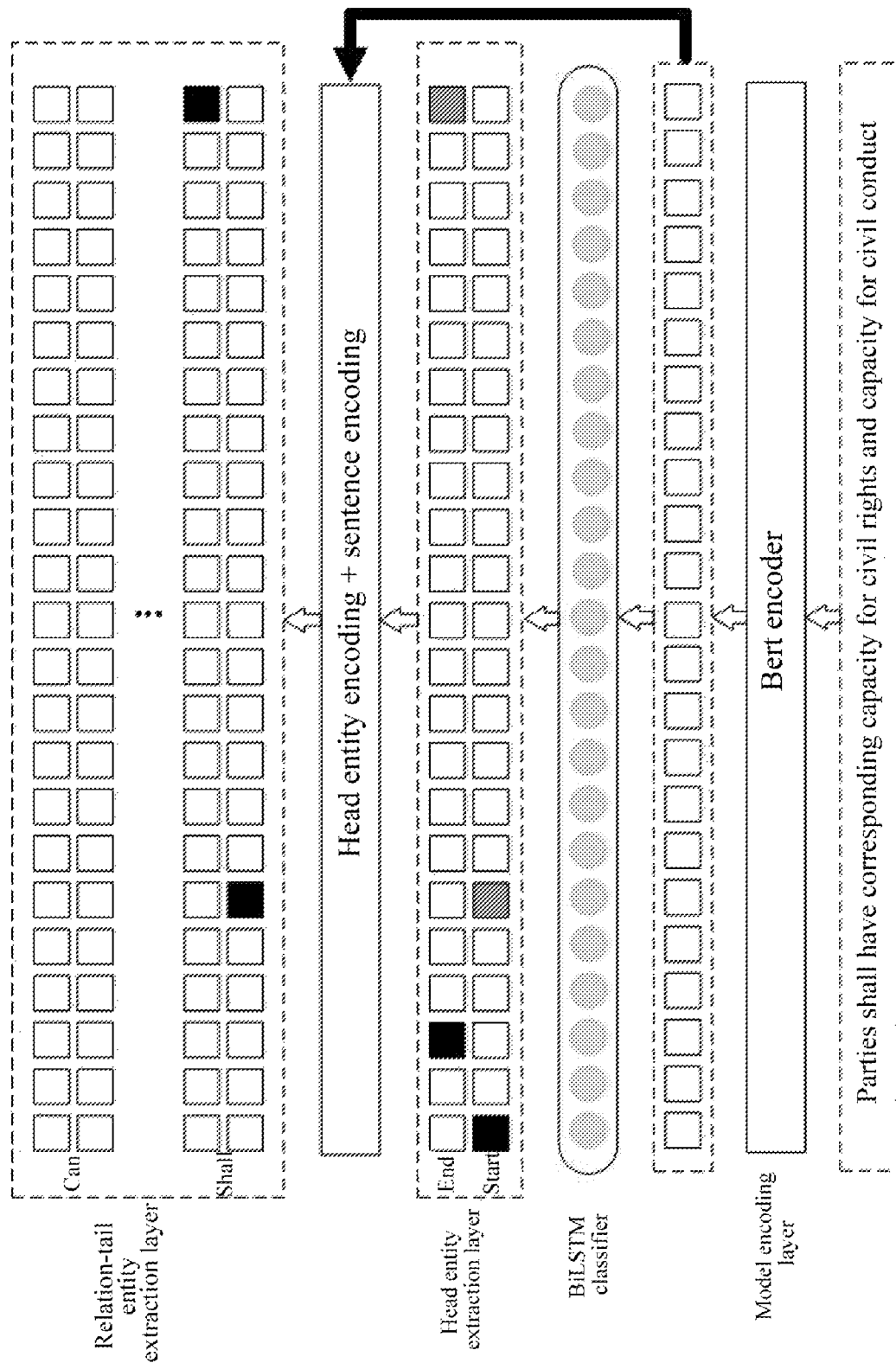
FIG. 3 is a model architecture diagram of extracting triples from text according to the embodiment of the present disclosure.

By the above analysis, an algorithm model of joint entity and relation extraction in the field of contract law is designed, and the model frame diagram is shown in the figure. The model is divided into three parts, namely, the encoding layer, the head entity extraction layer, and the relation-tail entity extraction layer. Refer to FIG. 3 for the model architecture diagram. The specific contents of each part are as follows:

(a) Encoding Layer

The encoding layer of the present disclosure adopts the Chinese pre-training model BERT-wwm-ext based on the whole word Mask on a larger scale corpus in the Xunfei Joint Laboratory of Harbin Institute of Technology, and the performance of the model is further improved on a plurality of benchmark tests. The model can be used to transform the input text into the form of feature vectors.

(b) Head Entity Extraction Layer

This layer is mainly composed of two BiLSTMs with the same structure. The feature vector $x_i$ output by a Bert encoding layer is used as an input, and the extracted start and end markers of the entity are output:

$$p_i^{h\_start} = \text{BiLSTM}(W_s x_i + b_s)$$

$$p_i^{h\_end} = \text{BiLSTM}(W_e x_i + b_e)$$

where $x_i$ is a feature vector of each word, $W_s$, $W_e$ are weight matrices that can be trained by two binary classifiers, and $b_s$, $b_e$ are respective bias vectors; $p_i^{start}$ is a marker of the start position of an entity, and when the value thereof approaches 1, it means that the position is the start position of the entity; $p_i^{end}$ is a marker of the end position of the entity, and when the value thereof approaches 1, it means that the position is the end position of the entity. For the example in FIG. 3, for the text "Parties shall have corresponding capacity for civil rights and capacity for civil conduct", the entities that can be extracted by the head entity extraction layer are "Parties" and "have corresponding capacity for civil rights and capacity for civil conduct" respectively. In FIG. 3, the black markers are the start position and end position of the "parties" entity, while the light gray markers are the start position and end position of another entity.

(c) Relation-Tail Entity Extraction Layer

Similar to the head entity extraction layer, this layer is also composed of two BiLSTMS with the same structure. The input of this layer model is not only the feature vector $h_s$ of the sentence, but also incorporates the head entity encoding $h_{head}^k$ extracted from the previous layer, where k represents the $k^{th}$ head entity. $h_s + h_{head}^k$ is taken as the input vector of this layer. The specific formula is:

$$p_i^{t\_start} = \text{BiLSTM}(W_s^r(x_i + h_{head}^k) + b_s^r)$$

$$p_i^{t\_end} = \text{BiLSTM}(W_e^r(x_i + h_{head}^k) + b_e^r)$$

where vectors $h_s$ and $h_{head}^k$ have a relation of direct vector addition, and have the same dimension; for the $k^{th}$ head entity, an average value of word vectors from the start position to the end position is taken as a representation of the vector $h_{head}^k$; $W_s^r$ and $W_e^r$ are trainable parameter matrices indicating the start position and the end position; for each head entity, all the relations in the relation set are traversed, the above calculation formula is repeated to find tail entities that may exist under each relation, thereby finally obtaining a complete triple. For the example in FIG. 3, when the relation between the head entity "parties" is "shall", the corresponding tail entity is "have corresponding capacity for civil rights and capacity for civil conduct", so a triple is obtained (parties, shall, have corresponding capacity for civil rights and capacity for civil conduct).

2.2) Using the Model

Figure 4:
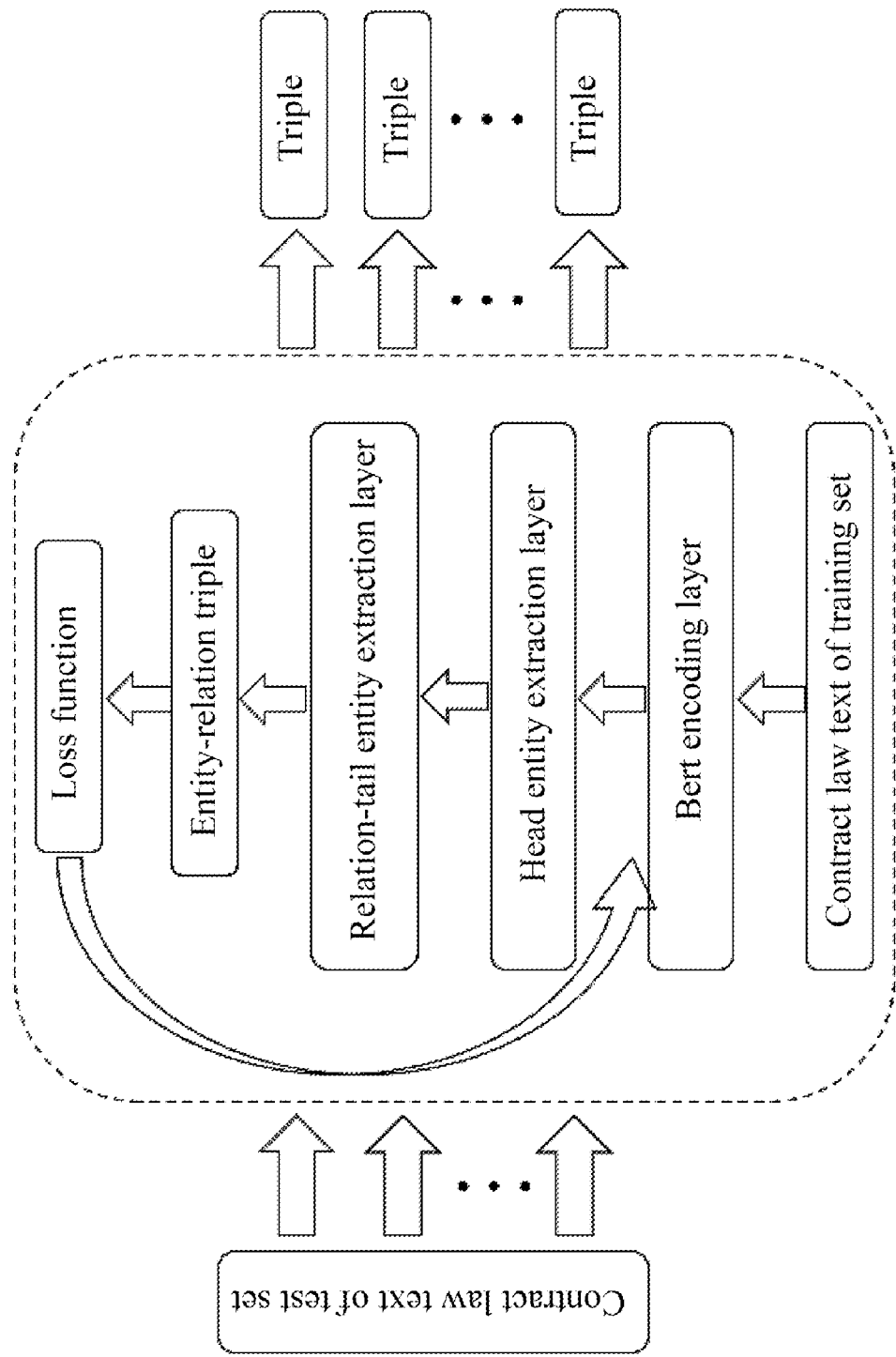
FIG. 4 is a schematic diagram of the training and use of the triple extraction model according to an embodiment of the present disclosure.

As shown in FIG. 4, the middle part is the training process of the model. The input of the model is the text of contract law. Triples output by the model are obtained by the Bert encoding layer, the head entity extraction layer and the relation-tail entity extraction layer respectively. Then, a given loss function is used for iterative optimization. When the loss function value tends to be stable, the iteration is stopped, the training of the model is completed, and the trained model is saved.

For the extraction of triples of contract law texts not included in the test set, the trained model is used as the input of the model, and the output of the model is the triple corresponding to the text.

Step 3: Determining the Relation Between Text Sentences.

For the contract law text without short sentence splitting, the open source tool pyltp combined with a rule matching method is used to determine the relation between the short sentences. Sentence relations include four kinds of relations: conditional, turning, juxtaposition and causality, among which there are 85 causal relations, 194 conditional relations, 34 turning relations and 8 juxtaposition relations. For example, for the contract law text "the parties shall have corresponding capacity for civil rights and capacity for civil conduct when concluding a contract", the sentence relation extracted from two short sentences is "conditional relation".

Step 4, Triple Combination and Graph Visualization, Including:

4.1) Integrating Triples.

A combined triple corresponding to the contract law text can be obtained from the triples extracted from the model based on the inter-sentence relations obtained in process 3. For the example "the parties shall have corresponding capacity for civil rights and capacity for civil conduct when concluding a contract", the final triple form can be ((parties, concluding, contract), conditions, (parties shall have corresponding capacity for civil rights and capacity for civil conduct)). By integrating and splicing all the extracted triples, a complete knowledge graph of contract law can be obtained.

4.2) Visualizing the Knowledge Graph of Contract Law.

Figure 5:
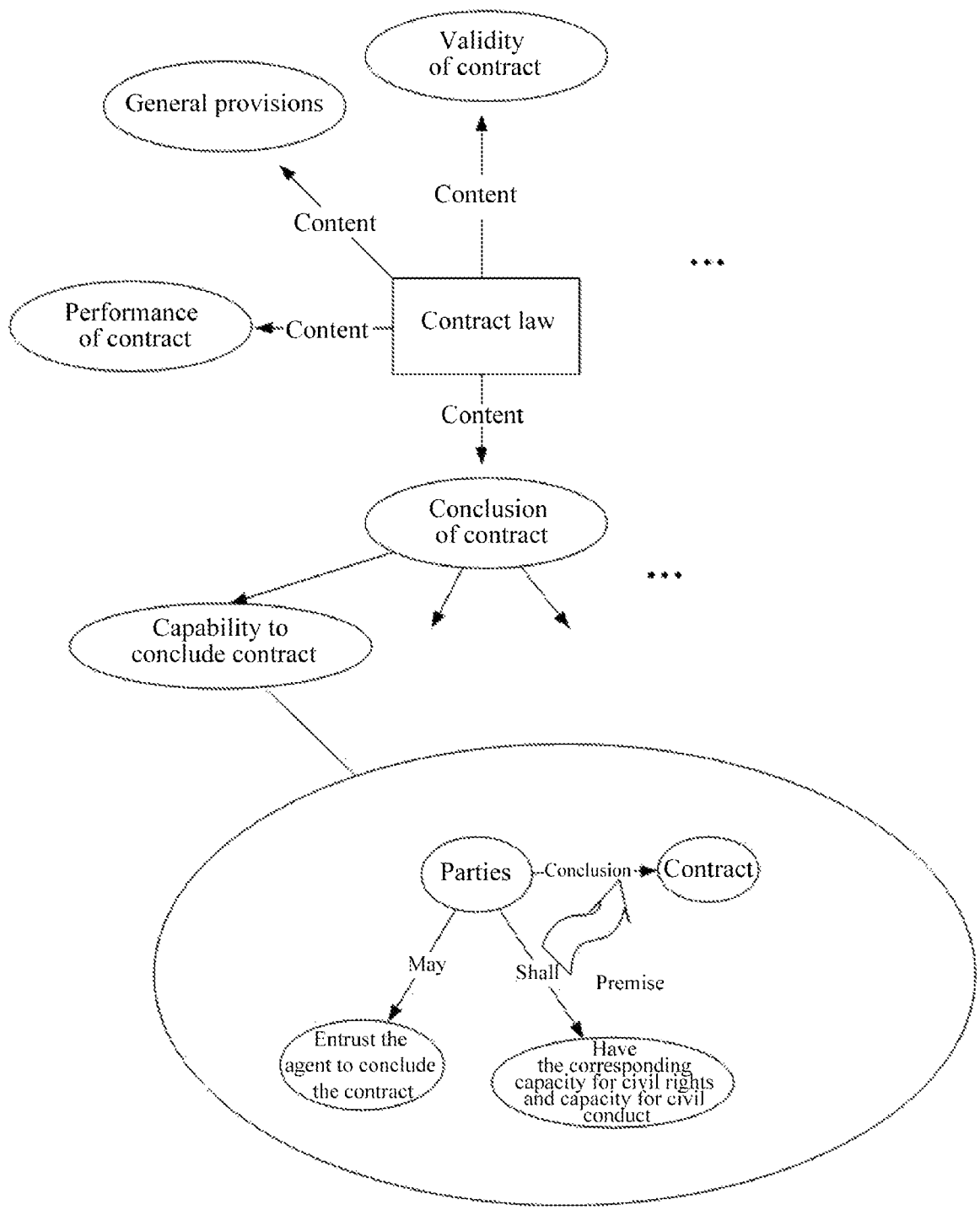
FIG. 5 is a visualization diagram of the knowledge graph constructed according to an embodiment of the present disclosure.

See FIG. 5, it is a partial schematic diagram of the knowledge graph of contract law after visualization. The completed knowledge graph of contract law can be combined with deep learning technology to realize the functions of question-and-answer reasoning and related recommendation in the field of contract law.

A legal knowledge graph construction system based on joint entity and relation extraction includes:

A triple data set construction module configured to split a sentence of a legal text into short sentences, complete default subjects in the short sentences, and finally extract triples from the short sentences to constructing a triple data set.

A model building and training module configured to respectively construct an encoding layer, a head entity extraction layer and a relation-tail entity extraction layer in a model architecture and obtain a model capable of extracting triples by training.

An inter-sentence relation determining module configured to determine the relation between short sentences for a sentence of the legal text which has not be split into short sentences.

A knowledge graph visualization module configured to obtain a combined triple corresponding to the legal text according to the triples extracted by the model and the relation between sentences of the text, and realize visualization of the legal knowledge graph.

A terminal device includes a memory, a processor and a computer program stored in the memory and running on the processor, wherein when the processor executes the computer program, the steps of the method for constructing a legal knowledge graph based on joint entity and relation extraction are implemented.

A computer-readable storage medium, which stores a computer program, wherein the computer program, when executed by a processor, implements the steps of the method for constructing a legal knowledge graph based on joint entity and relation extraction.

The computer program can be divided into one or more modules/units, which are stored in the memory and executed by the processor to implement the method for constructing a knowledge graph according to the present disclosure.

The processor can be a Central Processing Unit (CPU), or can be other general-purpose processors, Digital Signal Processors (DSPs), application specific integrated circuits (ASICs), Field-Programmable Gate Array (FPGAs) or other programmable logic devices, discrete gates or transistor logic devices, discrete hardware components, etc. The memory can be used to store computer programs and/or modules, and the processor can realize various functions of the knowledge graph building system of the present disclosure by running or executing the computer programs and/or modules stored in the memory and calling the data stored in the memory.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive). The above description is only a preferred embodiment of the present disclosure, and it is not intended to limit the technical solution of the present disclosure. It should be understood by those skilled in the art that the technical solution can be modified and replaced in a number of simple ways without departing from the spirit and principle of the present disclosure, and all these modifications and substitutions shall fall within the scope of protection covered by the claims.

What is claimed is:

1. A method for constructing a legal knowledge graph based on joint entity and relation extraction, comprising the following steps:
constructing a triple data set;
splitting a sentence of a legal text into short sentences;
completing default subjects in the short sentences using zero anaphora resolution and dependency parsing;
extracting triples from the short sentences and constructing the triple data set;
designing a model architecture and training a model;
wherein the model architecture comprises an encoding layer, a head entity extraction layer and a relation-tail entity extraction layer; and
wherein the encoding layer uses a Bert pre-training model;
two BiLSTMs are used as binary classifiers in the head entity extraction layer, and encoding of a text is used as an input of the classifiers; in output information, an entity start position corresponding to a first BiLSTM binary classifier is output as 1, with outputs of other positions being all 0, and an entity end position corresponding to a second BiLSTM binary classifier is output as 1, with outputs of other positions being all 0;
the relation-tail entity extraction layer combines encoding information of head entities with the encoding of the sentence as an input, and for each head entity, finds tail entities that may exist under each relation, and finally obtains a complete triple;
determining the relation between the sentences of the text;
determining, for a sentence of the legal text that has not been split into short sentences, the relation between the short sentences; and
combining triple and visualizing graph;
obtaining a combined triple corresponding to the legal text according to the triple extracted by the model and the relation between sentences of the text;
knowledge graph generation and storage;
generating the legal knowledge graph based on the combined triple, and storing the legal knowledge graph in a memory for subsequent retrieval and invocation;
application-oriented invocation and visualization:
executing computer-implemented legal applications based on the stored legal knowledge graph, comprising responding to question-and-answer reasoning requests and/or outputting relevant recommendation results, and visually displaying the legal knowledge graph.

2. The method for constructing a legal knowledge graph based on joint entity and relation extraction according to claim 1, wherein a subject and an object are taken as a head entity and a tail entity, respectively, and a predicate is taken as the relation when constructing the triple data set.

3. The method for constructing a legal knowledge graph based on joint entity and relation extraction according to claim 2, wherein a relation set is determined according to marked relations, and the relations with the same or similar semantics are merged.

4. The method for constructing a legal knowledge graph based on joint entity and relation extraction according to claim 1, wherein the head entity extraction layer takes a feature vector $x_i$ output by a Bert encoding layer as an input, and start and end marks of extracted entities are output:

$$p_i^{hstart}=\text{BiLSTM}(W_s x_i + b_s)$$

$$p_i^{hend}=\text{BiLSTM}(W_e x_i + b_e)$$

where $x_i$ is a feature vector of each word, $W_s$, $W_e$ are weight matrices that can be trained by two binary classifiers, and $b_s$, $b_e$ are bias vectors, respectivly; $p_i^{start}$ is a marker of the start position of an entity, and when a value thereof approaches 1, it means that the position is the start position of the entity; $p_i^{end}$ is a marker of the end position of the entity, and when the value thereof approaches 1, it means that the position is the end position of the entity.

5. The method for constructing a legal knowledge graph based on joint entity and relation extraction according to claim 1, wherein the relation-tail entity extraction layer is composed of two BiLSTMs with a same structure, and an input of a model of the layer comprises a feature vectors $h_s$ of the sentence, and incorporates a head entity encoding $h_{head}^k$ extracted from a previous layer, where k represents a $k^{th}$ head entity;

$h_s + h_{head}^k$ is taken as the input vector $x_i$ of the layer, and a calculation formula is as follows:

$$p_i^{tstart}=\text{BiLSTM}(W_s^r(x_i+h_{head}^k)+b_s^r)$$

$$p_i^{tend}=\text{BiLSTM}(W_e^r(x_i+h_{head}^k)+b_e^r)$$

where vectors $h_s$ and $h_{head}^k$ have a relation of direct vector addition, and have a same dimension; for the $k^{th}$ head entity, an average value of word vectors from the start position to the end position is taken as a representation of the vector $h_{head}^k$; $W_s^r$ and $W_e^r$ are trainable parameter matrices indicating the start position and the end position; for each head entity, all the relations in the relation set are traversed, the above calculation formula is repeated to find tail entities that may exist under each relation, thereby finally obtaining a complete triple.

6. A terminal device, comprising a memory, a processor and a computer program stored in the memory and running on the processor, wherein when the processor executes the computer program, the steps of the method for constructing a legal knowledge graph based on joint entity and relation extraction according to claim 1 are implemented.

7. A non-transitory computer-readable storage medium, which stores a computer program, wherein the computer program, when executed by a processor, implements the steps of the method for constructing a legal knowledge graph based on joint entity and relation extraction according to claim 1.

\* \* \* \* \*